United States Patent [19]

Elmer

[11] Patent Number: 4,605,632
[45] Date of Patent: Aug. 12, 1986

[54] GLASS FOR TUNGSTEN-HALOGEN LAMPS
[75] Inventor: Thomas H. Elmer, Corning, N.Y.
[73] Assignee: Corning Glass Works, Corning, N.Y.
[21] Appl. No.: 664,351
[22] Filed: Oct. 24, 1984
[51] Int. Cl.$^4$ ............................................... C03C 3/06
[52] U.S. Cl. ........................................ 501/54; 501/30; 501/904
[58] Field of Search ............................ 501/54, 30, 904; 65/DIG. 16, 3.15, 30.13

[56] References Cited

U.S. PATENT DOCUMENTS

| 2,106,744 | 3/1934 | Hood et al. | 501/65 |
| 2,221,709 | 11/1940 | Hood et al. | 501/54 |
| 3,258,351 | 6/1966 | Paymal | 501/54 |
| 3,258,352 | 6/1966 | Paymal | 501/54 |

FOREIGN PATENT DOCUMENTS

| 54-13472/1 | 10/1979 | Japan | 65/DIG. 16 |
| 59-45946 | 3/1984 | Japan | 65/DIG. 16 |

Primary Examiner—William R. Dixon, Jr.
Assistant Examiner—Ann Knab
Attorney, Agent, or Firm—C. S. Janes, Jr.

[57] ABSTRACT

This invention relates to the production of transparent, high silica glass envelopes for tungsten-halogen lamps consisting essentially, by weight, of 1–2.5% $Al_2O_3$, 0.25–1% CaO, 0.1–0.25 $Na_2O$ and/or $K_2O$, 2.5–3.5% $B_2O_3$, 0.15–0.3% F, and the remainder $SiO_2$.

1 Claim, No Drawings

GLASS FOR TUNGSTEN-HALOGEN LAMPS

BACKGROUND OF THE INVENTION

The European automotive industry has employed tungsten-halogen incandescent lamps for a number of years and the United States automotive industry has been using them in ever increasing amounts. Their advantages, when compared to the standard sealed beam headlight, are well known: a whiter light is emitted; a smaller size lamp produces an equivalent or even greater quantity of light; the intensity of the illumination remains virtually constant over the life of the lamp; and the service life is significantly longer.

Tungsten-halogen lamps operate at much higher temperatures, however, than conventional incandescent lamps. For example, temperatures in localized areas of the tungsten-halogen lamp envelope may range up to 700° C. Consequently, glasses suitable for such envelopes must be thermally stable (resist devitrification) and withstand thermal deformation at those temperatures.

Envelopes for such lamps have been prepared from 96% $SiO_2$ glasses of the type typified by Code 7913 glass, marketed by Corning Glass Works, Corning, N.Y., under the trademark VYCOR ®. Those glasses exhibit annealing points in the vicinity of 1000° C. and are essentially unaffected by the temperatures encountered during operation of the lamps.

Nevertheless, because of the very high annealing temperature, it is difficult and expensive to form into shapes and lampwork. Accordingly, a "softer" 96% $SiO_2$ glass was desired, i.e., a 96% $SiO_2$ glass exhibiting a somewhat lower annealing temperature, but which would retain the thermal stability and low water content of the glasses currently used for the lamp envelopes. A softer glass would permit more rapid machine sealing operations, less thermal wear of machine parts, and a reduction in energy consumption.

A low water content in the glass is critical in the operation of the lamps. For example, the glass may bubble when flameworked, or the interior surface may become blackened during use due to deterioration of the tungsten filament. Furthermore, removal of water from the glass increases the infrared transmittance of the glass at the well-known absorption band for wavelengths in the region of 2.72 microns. This absorption band typically appears in the infrared transmittance curves of water and of glasses in general and, in the latter, has been attributed to the presence of OH groups in the structure of the glass. Absorption, or conversely transmittance, at a wavelength of 2.6 microns is relatively insensitive to the low concentrations of residual water in glass bodies. Accordingly, the residual water content in glasses is customarily defined in terms of an absorption coefficient which is denominated the "beta value", designated "$\beta_{OH}$", and is calculated from the formula $$\beta_{OH} = \frac{1}{t} \log_{10} \frac{T_{2.6}}{T_{2.72}}$$

wherein
t = glass thickness in mm
$T_{2.6}$ = transmittance in percent at 2.6 microns
$T_{2.72}$ = transmittance in percent at 2.72 microns
$\beta_{OH}$ is expressed in terms of $mm^{-1}$

SUMMARY OF THE INVENTION

96% $SiO_2$ glasses have their genesis in U.S. Pat. No. 2,106,744. As is disclosed there, the method for preparing such glasses contemplates five fundamental steps:
(a) an article having a desired shape is formed from a parent borosilicate glass;
(b) that article is heat treated at a temperature between about 500°-600° C. for a sufficient length of time to internally separate the glass into a silica-rich phase and silica-poor or borate-rich phase;
(c) the article is contacted with an acid (usually to mineral acid) to leach out the silica-poor phase to produce a porous structure composed of the silica-rich phase consisting of a plurality of intercommunicating, submicroscopic pores throughout the article;
(d) the porous article is washed to remove the leachant residue and dried; and then
(e) the porous article is consolidated into a non-porous body by heating without fusion (generally about 1200°-1300° C).

Glass produced by the above process has been referred to commercially as 96% $SiO_2$ glass without regard to the exact silica content thereof, and that is the sense in which the expression is employed here. For example, Code 7913 glass above has the approximate composition, in weight percent, of 96.5% $SiO_2$, 0.5% $R_2O_3 + RO_2$, and 3% $B_2O_3$ consists essentially of $Al_2O_3$ and $RO_2$ consists essentially of $ZrO_2$ and/or $TiO_2$.

My invention resides in the discovery of glasses exhibiting physical properties essentially similar to those demonstrated by conventional 96% $SiO_2$ glasses, but wherein the annealing point has been reduced at least 50° C. and, preferably, in the neighborhood of 100° C. Hence, the inventive glasses exhibit annealing points between about 900°-925° C., while retaining excellent thermal stability and low water content, i.e., a $\beta_{OH}$ value of <0.4 $mm^{-1}$, thereby rendering them eminently suitable for use as envelopes for tungsten-halogen lamps.

The method for preparing the desired transparent, essentially colorless, high silica glass envelope involves modifications in the basic procedure for producing 96% $SiO_2$ glass articles. Hence, the inventive method comprises the following general steps:
(1) an article having a particular shape is formed from a parent borosilicate glass;
(2) that article is heat treated to cause the glass to internally separate into a silica-rich phase and silica-poor phase;
(3) the phase separated article is contacted with an acid to leach out the silica-poor phase, yielding a porous structure consisting of the silica-rich phase containing a multiplicity of intercommunicating submicroscopic pores throughout the article;
(4) the porous article is contacted with a fluorine-containing fluid to remove OH groups from the constitution of the glass;
(5) the dewatered article is impregnated with a salt solution containing ions of aluminum, calcium, and potassium and/or sodium; and
(6) the impregnated article is dried and fired without fusion to consolidate it into a non-porous body, thereby incorporating the ions introduced by the impregnating salt.

Variations in the sequence of and in the individual elements of the above steps are possible. For example:

(a) customarily, the acid leachant will be rinsed out of the pores and the porous body dried before being contacted with the fluorine-containing fluid to dewater the glass;

(b) the fluorine-containing material may be either a liquid or a gas; a material which leaves no non-volatile residue in the pores of the article during or after treatment such as HF, the ammonium fluorides $NH_4F$ and $NH_4HF_2$, and fluorides of paraffin hydrocarbons being preferred;

(c) impregnation with the metal salt solution will generally occur more uniformly when the fluoride-treated structure is wet before the impregnation treatment;

(d) metal salts which thermally decompose to form metal oxides and leave no extraneous non-volatile residue such as $Al(NO_3)_3.9H_2O$, $Ca(NO_3).4H_2O$, $KNO_3$, and $NaNO_3$ are preferred; and (e) rather than first fluoride treating the porous body and then impregnating with the salt solution, the fluorine-containing material may be combined with the salt solution and impregnation carried out in a single step.

Whereas an effect upon the annealing point of the glass can be seen with very small additions of metal salts and fluorides, laboratory experience has demonstrated that for decreases of about 50°-100° C., while retaining the necessary properties of low water content ($\beta_{OH}<0.4$) and high thermal stability (resistance to unwanted devitrification), the final glass composition will contain, on the oxide basis, about 1-2.5% $Al_2O_3$, 0.25-1% CaO, 0.1-0.25% $K_2O$ and/or $Na_2O$, and 0.15-0.3% F. Because of those additions and because the residual 2.5-3.5% by weight $B_2O_3$ is not substantially altered by the treatments applied to the glass, the glass is no longer a "96% $SiO_2$" glass. Accordingly, the treated products have been termed high silica glasses.

DESCRIPTION OF PREFERRED EMBODIMENTS

Individual solutions of various concentrations were prepared by dissolving reagent grade $Al(NO_3)_3.9H_2O$, $Ca(NO_3)_2.4H_2O$, $NaNO_3$, and $KNO_3$ in acidulated distilled water (0.15N $HNO_3$) at 95° C. Porous 96% $SiO_2$ tubing (Corning Code 7930) having a diameter of 14.1 mm and a wall thickness of 1.3 mm was cut into 3.6" lengths. Those lengths were immersed into distilled water to fill the pores and then transferred to the desired salt solution operating at 95° C. After an impregnation period of three hours, the tube sections were given three rapid dips (~3 seconds/dip) into each of three beakers containing distilled water at room temperature. The tubes were wiped dry and inserted into an oven operating at 60° C. Following three hours drying at 60° C., the oven temperature was gradually increased to 185° C. to eliminate molecular water in the glass pores. The tubing samples were thereafter inserted into a tube furnace and fired according to the schedule below to consolidate the porous tubing, the wall thickness of the consolidated tubing being about 1.2 mm. A stream of air was passed over the specimens during the firing period to sweep out moisture and decomposition products evolved from the impregnated glass.

Heated at 160° C./hour to 900° C.
Heated at 100° C./hour to 1150° C.
Held at 1150° C. for one hour.
Cooled at a rate somewhat faster than 160° C./hour to ~1030° C.
Removed from furnace.

Chemical analysis of the consolidated glass is both costly and time comsuming. However, a relatively close approximation of the analyzed value of metal oxide content can be derived from the following calculation:

$W_1$ = Weight % metal salt in solution
$W_2$ = $W_1$ converted to weight % metal oxide
S = Specific gravity of metal salt solution The pore space in the porous glass occupied by water held at saturation is 25% by weight, based upon the fired glass. That factor is used for calculating the amount of metal oxide in 100 grams of water-free porous glass.

$$W_3 = \frac{S \times 25 \times W_2}{100} =$$

Grams of metal oxide introduced into the glass $$W_4 = \frac{W_3 \times 100}{W_3 + 100} = \text{Weight \% metal oxide in final glass}$$

The water contents (OH groups) in terms of the absorption coefficient ($\beta_{OH}$) were measured at the OH absorption band at a wavelength of 2.72 microns. Determinations of annealing points (Ann. Pt.) and coefficients of thermal expansion (Coef. Exp.) over the range of 25°-400° C. expressed in terms of $\times 10^{-7}$/°C. were conducted utilizing techniques conventional in the glass art. The annealing point was adjudged to be the temperature at which the glass exhibited a viscosity of $10^{13}$ poises.

Table I summarizes physical property data measured on tube sections which had been impregnated with solutions containing from 45.92-228.60 grams of $Al(NO_3)_3.9H_2O$ in 150 ml of 0.15N.$HNO_3$. (Example 6 constituted a section of porous tubing which was not impregnated with the salt solution to serve as a control sample.) The fired $Al_2O_3$-containing specimens exhibited narrow bands of light opacity at near the inside and outside walls of the tubing which could be removed via subsequent firepolishing.

TABLE I

| Ex. | $Al(NO_3)_3.9H_2O$ | $Al_2O_3$ in Glass | Ann. Pt. | $\beta_{OH}$ |
|---|---|---|---|---|
| 1 | 45.72 g | 0.89% | 959° C. | 0.394 mm$^{-1}$ |
| 2 | 91.44 g | 1.56% | 963° C. | 0.413 mm$^{-1}$ |
| 3 | 137.16 g | 2.10% | 957° C. | 0.469 mm$^{-1}$ |
| 4 | 182.88 g | 2.48% | 956° C. | 0.433 mm$^{-1}$ |
| 5 | 228.60 g | 2.79% | 954° C. | 0.415 mm$^{-1}$ |
| 6 | — | — | 1020° C. | 0.268 mm$^{-1}$ |

The effect of $Al_2O_3$ in reducing the annealing point of the glass is quite evident. However, increased amounts of $Al_2O_3$ hazard stability at elevated temperatures.

Table II reports impregnating solutions utilized for incorporating various amounts of CaO into the glass. A procedure corresponding to that described above for the $Al_2O_3$-containing tube samples was also used here except that the top temperature utilized for consolidation was 1180° C. Each of the fired tubes exhibited some opalization which could be removed through subsequent firepolishing. The amount of CaO recorded as being present in the glass was calculated in the manner described above for $Al_2O_3$. Because of the opalization developed, annealing point determinations were not conducted.

TABLE II

| Example | Ca(NO₃)₂.4H₂O | CaO in Glass | $\beta_{OH}$ |
|---|---|---|---|
| 7 | 5.05 g | 0.19% | 0.526 mm⁻¹ |
| 8 | 10.11 g | 0.37% | 0.454 mm⁻¹ |
| 9 | 15.16 g | 0.54% | 0.380 mm⁻¹ |
| 10 | 20.21 g | 0.70% | 0.403 mm⁻¹ |
| 11 | 25.27 g | 0.85% | 0.387 mm⁻¹ |

Table III summarizes data for tube specimens impregnated with a mixture consisting of a constant level of Al(NO₃).9H₂O with increasing amounts of Ca(NO₃)₂.4H₂O. The procedure utilized tracked that recorded above for the examples in Table II. The weights recorded for Al₂O₃ and CaO in the glasses are again calculated values.

TABLE III

| Example | Al(NO₃)₃.9H₂O | Ca(NO₃)₂.4H₂O | Al₂O₃ | CaO | Ann. Pt. | $\beta_{OH}$ |
|---|---|---|---|---|---|---|
| 12 | 137.16 g | 5.05 g | 1.94% | 0.13% | 947° C. | 0.542 mm⁻¹ |
| 13 | 137.16 g | 10.11 g | 1.91% | 0.25% | — | 0.566 mm⁻¹ |
| 14 | 137.16 g | 15.16 g | 1.89% | 0.36% | 947° C. | 0.535 mm⁻¹ |
| 15 | 137.16 g | 20.21 g | 1.86% | 0.48% | — | 0.491 mm⁻¹ |
| 16 | 137.16 g | 25.27 g | 1.82% | 0.59% | 940° C. | 0.538 mm⁻¹ |
| 17 | 137.16 g | 37.91 g | 1.78% | 0.86% | 943° C. | 0.511 mm⁻¹ |

Although not immediately evident, close inspection of the fired samples discovered the presence of narrow bands of light opacity at near the inside and outside walls of the tubing. Such could be removed through light subsequent firepolishing.

A comparison of the data for Example 16 with those of Example 3 illustrates that the annealing point was lowered from 957° C. to 940° C. through the addition of 25.27 grams Ca(NO₃)₂.4H₂O to the Al(NO₃)₃.9H₂O solution employed in Example 3. The final glass of Example 16 contained about 2.10% Al₂O₃ and 1.82% CaO. Inasmuch as the untreated glass demonstrated an annealing point of 1020° C., the combination of Al₂O₃ and CaO of Example 16 has resulted in a decrease of 80° C.

Table IV reports data measured on tubing specimens which had been impregnated with solutions containing 45.72–228.60 grams Al(NO₃)₃.9H₂O and 1.337–2.521 grams NaNO₃. The procedure employed following that recorded above for the examples in Tables II and III. The weights of Al₂O₃ and Na₂O tabulated again reflect calculated values.

TABLE IV

| Example | Al(NO₃)₃.9H₂O | NaNO₃ | Al₂O₃ | Na₂O | Ann. Pt. | $\beta_{OH}$ |
|---|---|---|---|---|---|---|
| 18 | 45.72 g | 1.337 g | 0.89% | 0.070% | — | 0.420 mm⁻¹ |
| 19 | 91.44 g | 1.578 g | 1.56% | 0.073% | — | 0.451 mm⁻¹ |
| 20 | 137.16 g | 1.896 g | 2.08% | 0.077% | — | 0.470 mm⁻¹ |
| 21 | 182.88 g | 2.225 g | 2.46% | 0.080% | 942° C. | 0.468 mm⁻¹ |
| 22 | 228.60 g | 2.521 g | 2.77% | 0.082% | 948° C. | 0.464 mm⁻¹ |

Table V comprises a recital of physical properties determined on a group of tubing samples impregnated with a solution composed of a constant current of Al(NO₃)₃.9H₂O with increasing amounts of Ca(NO₃)₂.4H₂O and NaNO₃. The samples were subjected to the treatments reported above with respect to Table II, III, and IV. The listed weights of Al₂O₃, CaO, and Na₂O again represent calculated values.

TABLE V

| Example | Al(NO₃)₃.9H₂O | Ca(NO₃)₂.4H₂O | NaNO₃ | Al₂O₃ | CaO | Na₂O | Ann. Pt. | $\beta_{OH}$ |
|---|---|---|---|---|---|---|---|---|
| 23 | 137.16 g | 5.05 g | 2.433 g | 1.93% | 0.12% | 0.092% | — | 0.417 mm⁻¹ |
| 24 | 137.16 g | 10.11 g | 2,477 g | 1.91% | 0.25% | 0.093% | — | 0.467 mm⁻¹ |
| 25 | 137.16 g | 15.16 g | 2.509 g | 1.88% | 0.36% | 0.092% | — | 0.460 mm⁻¹ |
| 26 | 137.16 g | 20.21 g | 2.521 g | 1.86% | 0.48% | 0.092% | — | 0.449 mm⁻¹ |
| 27 | 137.16 g | 25.27 g | 2.564 g | 1.84% | 0.59% | 0.094% | 937° C. | 0.480 mm⁻¹ |
| 28 | 137.16 g | 37.91 g | 2.773 g | 1.79% | 0.86% | 0.097% | 936° C. | 0.514 mm⁻¹ |

Two groups of samples of porous tubing sections were impregnated with a solution consisting of content levels of Al(NO₃)₃.9H₂O and Ca(NO₃)₂.4H₂O with different amounts of NaNO₃ therein. The specimens were impregnated for six hours in the salt solutions at 95° C. After rinsing in distilled water, being wiped dry, and then drying for three hours in an oven operating at 60° C., the oven temperature was raised to only 90° C. Thereafter, the samples were transferred to a tube furnace, heated at 100° C./hour to 1170° C., held at 1170° C. for 20 minutes, cooled at 100° C./hour to 980° C., and then removed from the furnace. Table VI summarizes the results of that work. The recorded weights of Al₂O₃, CaO, and Na₂O again reflect calculated values.

TABLE VI

| Example | Al(NO₃)₃.9H₂O | Ca(NO₃)₂.4H₂O | NaNO₃ | Al₂O₃ | CaO | Na₂O | Ann. Pt. | $\beta_{OH}$ | Coef. Exp. |
|---|---|---|---|---|---|---|---|---|---|
| 29 | 137.16 g | 37.91 g | 2.773 g | 1.79% | 0.86% | 0.097% | 928° C. | 0.611 mm⁻¹ | 9.4 |
| 30 | 137.16 g | 37.91 g | 8.319 g | 1.76% | 0.85% | 0.287% | 928° C. | 0.574 mm⁻¹ | 8.5 |

Close inspection showed the consolidated tubing to be sligthly out-of-round, thereby indicating the need for lower consolidation temperatures to preclude the occurrence of thermal deformation.

The above examples unambiguously demonstrated that the annealing point of 96% SiO₂ glass could be substantially lowered through the incorporation of a combination of Al₂O₃, CaO, and NaNO₃ therein. Nevertheless, the levels of CaO and Na₂O must be kept low because of their action as mineralizing agents for vitreous silica, leading to devitrification upon extended exposure to high temperature. Accordingly, suitable maxima for additions of the three components are 2% $Al_2O_3$, 1% CaO, and 0.2% $Na_2O$. Such additions raise the coefficient of thermal expansion of 96% $SiO_2$ glass only very slightly from the customary value of $\sim 7.5 \times 10^{-7}/°C$. However, the additions exerted a severely adverse effect upon the water content of the glasses.

Table VI summarizes physical property data determined on tubing sections which had been impregnated with 150 ml of 0.15N $HNO_3$ solution containing 137.16 grams $Al(NO_3)_3.9H_2O$, 37.91 grams $Ca(NO_3)_2.4H_2O$, and 4.95 grams $KNO_3$. $KNO_3$ was substituted for $NaNO_3$ because $K^+$ ions have less tendency to devitrify the silica network than $Na^+$ ions. The solution makeup comprises Example 28 except that the $KNO_3$ content is 1.5 times the $NaNO_3$ level thereof on the molecular basis. Solutions of varying concentrations of $NH_4F$ were prepared by admixing $NH_4F$ with distilled water or with acidulated distilled water (1N $HNO_3$).

Porous tubing sections which had been equilibrated in the ambient environment were immersed into a 2.5% by weight $NH_4F$ solution, removed therefrom, rinsed for one minute in distilled water, and then immersed into the $Al(NO_3)_3.9H_2O$, $Ca(NO_3)_2.4H_2O$, $KNO_3$-containing salt solution. After an impregnation of one hour, the specimens were subjected to three rapid dips ($\sim 10$ seconds/dip) into each of three beakers containing distilled water, and exposed to a stream of air to eliminate droplets of water from the inside and outside surfaces of the tubing sections.

The impregnated samples were stood vertically in an oven operating at about 64° C., maintained for several hours at that temperature, and then gradually heated to about 100° C. to remove additional amounts of mechanically-held water. After a minimum period of one hour at that temperature, the specimens were transferred from the oven into a tube furnace, heated therein at 100° C./hour up to 1210° C., maintained at 1210° C. for 30 minutes, cooled at 160° C./hour to about 1100° C., and then cooled overnight at the natural cooling rate of the furnace. The tube furnace was continually flushed with dried air during the firing cycle, the flow rate of the air being 130 cm$^3$/minute, as measured at standard conditions, to eliminate products of decomposition evolved from the salt-containing porous glass. Up until a temperature of about 450° C., the vapors were found to contain acidic gases and oxides of nitrogen. Moisture continued to be evolved as the temperature was raised, the amount decreasing dramatically at temperatures where the porous glass commenced to consolidate.

Other examples were subjected to the same $NH_4F$ treatment, but then were immersed for 15 minutes into 1N.$HNO_3$ at 95° C. prior to being impregnated with the salt solution.

TABLE VII

| Ex. | 30 minutes in | Rinse | Impreg. | Ann. Pt. |
|---|---|---|---|---|
| 29 | 2.5% $NH_4F$ in distilled $H_2O$ | $H_2O$ (1 min.) | 1 hour | 903.8° C. |
| 30 | 2.5% $NH_4F$ in distilled $H_2O$ | 1N $HNO_3$ (15 min.) | " | 911.6° C. |
| 31 | 2.5% $NH_4F$ in 1N $NHO_3$ | $H_2O$ (1 minute) | " | 913.0° C. |
| 32 | 2.5% $NH_4F$ in 1N $NHO_3$ | 1N $HNO_3$ (15 min.) | " | 914.3° C. |

Table VII clearly illustrates that the annealing point of 96% $SiO_2$ glass can be lowered to less than 920° C. via successive impregnation with $NH_4F$ and an aluminum-calcium-potassium salt solution. Examples 29 and 30 exhibited brilliant surfaces upon consolidation, whereas Example 31 and 32 manifested defects in the form of haze and surface frosting, respectively, presumably resulting from chemical etching.

Table VII reports data obtained on porous tubing samples subjected to a single impregnation in a solution containing both $NH_4F$ and the aluminum-calcium-potassium salts. Thus, samples were prewet in 0.5N $HNO_3$ to simulate leached and rinsed tubing, and thereafter immersed into a solution wherein $NH_4F$ had been admixed with the aluminum-calcium-potassium salts. Immersion, rinsing, drying, and firing were carried out as described above with respect to Table VI. Another set of samples was exposed to the same treatments except that the porous glass sections were not prewetted. A third set of specimens was prewetted in 0.15N $HNO_3$ and then subjected to the above-described immersion, rinsing, drying, and firing, but wherein the immersion was conducted in the salt solution free from $NH_4F$. A fourth set of samples was treated in like manner to the above third set except the porous tubing was not prewetted.

Aliquots from stock solutions were used in the above studies and all samples were processed simultaneously. And, as noted above, each specimen was exposed to a like drying and firing history.

TABLE VIII

| Example | Prewet | Impregnating Solution | Impregnating Time | Ann. Pt. |
|---|---|---|---|---|
| 33 | Yes | With $NH_4F$ | 1 hour | 914.9° C. |
| 34 | Yes | With $NH_4F$ | 2 hours | 918.9° C. |
| 35 | No | With $NH_4F$ | 1 hour | 914.5° C. |
| 36 | Yes | No $NH_4F$ | 1 hour | 921.9° C. |
| 37 | No | No $NH_4F$ | 1 hour | 925.6° C. |

The data of Table VIII indicate that fluoride ions operate to reduce the annealing point of the glass by several °C. All of the above examples displayed brilliant surfaces upon consolidation, thereby indicating that impregnation in the fluoride-containing salt solution does not cause appearance-related glass problems.

Further studies were undertaken with impregnating solutions of aluminum-calcium-potassium salts containing $NH_4F$ in amounts equivalent to 2.5%, 5%, 7.5%, and 10% by weight $NH_4F$ in aqueous solutions to learn whether the presence of the salts might permit the use of higher fluoride levels than those possible in $NH_4F$/water mixtures, thereby producing glasses not only of additionally reduced annealing points but also of very low water contents. The immersion, rinsing, drying, and firing steps followed the procedure outlined above with respect to Table VI.

Table IX lists the treatment used, whether splitting at the leach plane on firing was observed, and the water content as expressed in terms of $\beta_{OH}$.

TABLE IX

| Example | % $NH_4F$ | Split at Leach Plane | $\beta_{OH}$ |
|---|---|---|---|
| 38 | — | No | 0.590 |
| 39 | 2.5 | No | 0.380 |
| 40 | 5.0 | Some | 0.227 |
| 41 | 7.5 | Severe | 0.140 |
| 42 | 10.0 | Severe | 0.091 |

As is evident from Table IX, increased fluoride concentrations significantly reduce the water content in the consolidated glass but, unfortunately, result in splitting of the tubing on firing. Accordingly, 3% NH$_4$F has been deemed to constitute a safe maximum. The tubing exhibited brilliant surfaces.

Table X summarizes the chemical composition (analyzed in weight %), $\beta_{OH}$ values, and the annealing points of a number of the previous samples prepared by the one step and two step impregnation processes. The coefficients of thermal expansion (25°–400° C.) are reported for two samples.

TABLE X

| Example | Al$_2$O$_3$ | CaO | K$_2$O | F | Ann. Pt. | $\beta_{OH}$ | Coef. Exp. |
|---------|-------------|-------|--------|-------|-----------|----------------------|------------|
| 29 | 1.32% | 0.57% | 0.15% | 0.23% | 903.8° C. | 0.271 mm$^{-1}$ | 10.1 |
| 30 | 1.36% | 0.55% | 0.15% | 0.22% | 911.6° C. | 0.330 mm$^{-1}$ | — |
| 33 | 1.16% | 0.43% | 0.13% | 0.12% | 914.9° C. | 0.418 mm$^{-1}$ | 9.8 |
| 35 | 1.41% | 0.54% | 0.16% | 0.13% | 914.5° C. | 0.460 mm$^{-1}$ | — |
| 36 | 1.42% | 0.55% | 0.16% | — | 921.9° C. | 0.664 mm$^{-1}$ | — |
| 37 | 1.34% | 0.52% | 0.15% | — | 925.1° C. | 0.736 mm$^{-1}$ | — |

The analyzed compositions of Examples 29 and 30 are quite close as can be observed in Table X. The fact that Example 29 exhibits a lower annealing point than Example 30 suggests that there are subtle differences in the manner in which the fluoride and/or oxide constituents are incorporated in the silica network, i.e., distribution in the glass structure. Furthermore, the data indicate that the final composition of the consolidated glass is dependent to some extent upon whether the porous glass is prewetted; also that the annealing points of the final consolidated glasses are not substantially affected by small differences in glass composition. Finally, to insure an annealing point below 920° C. and, preferably, below 915° C., and $\beta_{OH}$ values below 0.4 mm$^{-1}$ and, preferably, below 0.35 mm$^{-1}$, while avoiding severe attack at the leach plane, a fluoride content between about 0.15–0.3% by weight can be utilized.

I claim:

1. A transparent, high silica glass envelope for a tungsten-halogen incandescent lamp, said glass exhibiting an annealing point between about 900°–925° C. and a $\beta_{OH}$ value below 0.4 mm$^{-1}$ and consisting essentially, expressed in terms of weight percent on the oxide basis, of about 1–2.5% Al$_2$O$_3$, 0.25–1% CaO, 0.1–0.25% Na$_2$O and/or K$_2$O, 2.5–3.5% B$_2$O$_3$, 0.15–0.3% F, and the remainder SiO$_2$.

* * * * *

UNITED STATES PATENT AND TRADEMARK OFFICE
CERTIFICATE OF CORRECTION

PATENT NO. : 4,605,632
DATED : August 12, 1986
INVENTOR(S) : Thomas H. Elmer

It is certified that error appears in the above-identified patent and that said Letters Patent is hereby corrected as shown below:

Column 2, line 28, after "$B_2O_3$", insert --where $R_2O_3$--.

Column 7, line 54, change "IN" to --1N--.

Column 8, line 11, change "0.5N" to --0.15N--.

Signed and Sealed this

Twenty-fourth Day of March, 1987

Attest:

DONALD J. QUIGG

Attesting Officer

Commissioner of Patents and Trademarks